United States Patent [19]
Groetzinger

[11] Patent Number: 5,593,585
[45] Date of Patent: Jan. 14, 1997

[54] SPRAY SYSTEM FOR CLEANING A FILTER SCREEN

[76] Inventor: John K. Groetzinger, 12811 Gramlich Rd., LaVale, Md. 21502

[21] Appl. No.: 306,396
[22] Filed: Sep. 15, 1994
[51] Int. Cl.⁶ ............................. B01D 29/62; B01D 33/44
[52] U.S. Cl. ........................ 210/409; 210/408; 210/389; 210/391; 209/380; 118/603; 118/610
[58] Field of Search ........................... 210/409, 408, 210/412, 391, 392, 388, 389; 209/380; 118/602, 603, 610

[56] References Cited

U.S. PATENT DOCUMENTS

| | | |
|---|---|---|
| 955,898 | 4/1910 | Petsche . |
| 2,608,910 | 9/1952 | McCrystle . |
| 3,357,567 | 12/1967 | Wake . |
| 3,587,975 | 6/1971 | Moffett . |
| 4,076,033 | 2/1978 | Busse et al. . |
| 4,468,325 | 8/1984 | Yock . |
| 5,110,366 | 5/1992 | McGregor . |
| 5,401,899 | 3/1995 | Bryant . |
| 5,429,247 | 7/1995 | Lemay . |
| 5,431,287 | 7/1995 | Knox . |
| 5,462,673 | 10/1995 | Piers . |

FOREIGN PATENT DOCUMENTS 2451740   5/1976   Germany .

*Primary Examiner*—Thomas M. Lithgow

[57] ABSTRACT

A screening chamber for filtering paper coatings is cleaned with the use of a plurality of water sprays. The water sprays are provided by nozzles located on spray bars positioned transversely across the width of the screening chamber. The nozzles are oriented to direct selected spray patterns tangentially against the screens, and against the interior surfaces of the screening chambers, to remove particulates, debris and other contaminates which collect on the screen during the filtering process.

9 Claims, 3 Drawing Sheets

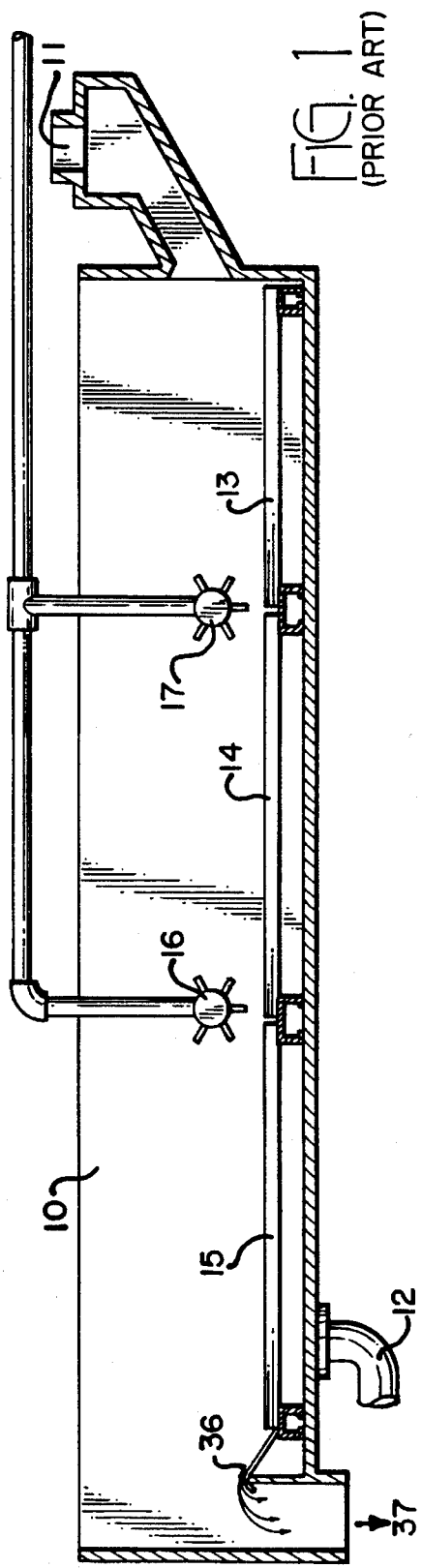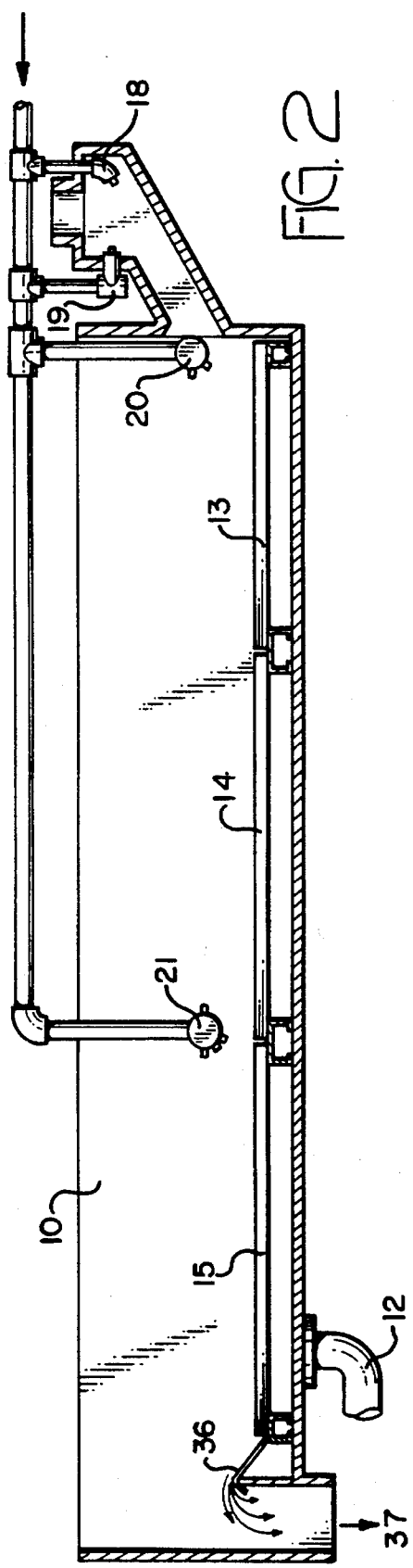

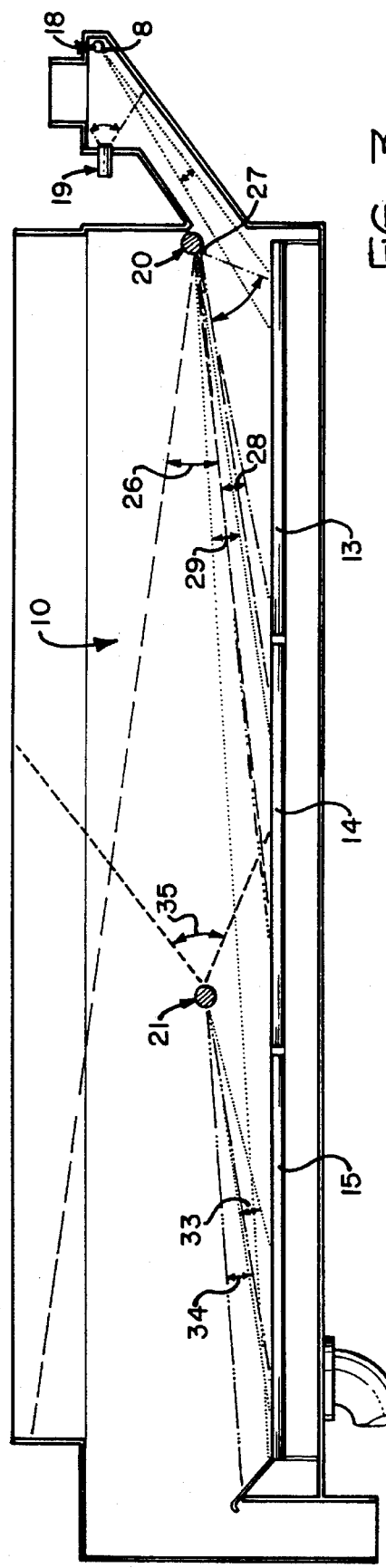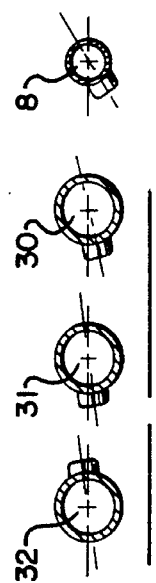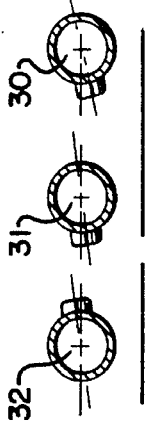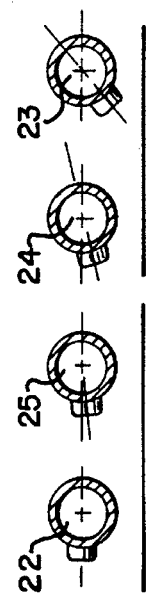

SPRAY SYSTEM FOR CLEANING A FILTER SCREEN

BACKGROUND OF INVENTION

The present invention pertains to a method and apparatus for cleaning screens which are used for filtering liquids, e.g., paints, adhesives and coatings. More particularly, it pertains to a novel spray system comprising spray bars with multiple nozzles located in close proximity to a coating filter screen for backwashing the screen and for removing particulates collected thereon.

Filter screens are used in many different industries for removing particulates, debris and other foreign matter from the products being manufactured or from products used in the manufacturing process. In the present invention, the screen comprises a part of a paper coating process and is used to filter the coating materials which are applied to the paper to make the paper glossy and smooth.

Coating screens of the type disclosed herein are located between the coating kitchen where the paper coatings are made up, and the coating pan where the coatings are actually applied to the paper. The coatings, as made up in the coating kitchen, are generally fairly clean, but they still must be screened to remove particulates greater than about 50-75 microns in size, to ensure good coating flow during the coating application process, and to eliminate the possibility of scratches on the paper surface. However, the coating material may become contaminated during the coating process when loose fibers from the web, which are dislodged during the coating process, end up as part of the recirculated coating material returned to the coating pan. These contaminates plus dried chunks of coating which flake off the coating pan, and dried coating layers which form within the screening chamber are also returned as make-up to the coating supply tank. Thus, coating screens are used in the coating kitchen where coatings are initially made up before the coating material is pumped to the coating supply tank, and for the purpose of cleaning make-up coating returned from the coating pan to the coating supply tank. During these filtering processes, the screens become clogged with contaminates and must be cleaned on a regular basis.

In the past, attempts by others to wash and clean coating screens have involved a number of different schemes. It is known, for instance to tilt a filter screen as it is being spray washed to remove contaminates. Other methods employed in the past for cleaning filter screens and tanks include spray nozzles that are movable to provide a variable spray area, nozzles on header pipes which travel over the screen, and nozzles on header pipes which are rotated above the filter screen to produce a cleaning action (see U.S. Pat. Nos. 3,587,975; 4,076,033; and 5,110,366). However, each of these cleaning systems have been found to include drawbacks and deficiencies, particularly for cleaning coating screens as disclosed herein.

An example of a typical coating screen used in the paper industry is the SWECO screen manufactured by the SWECO Mfg. Company, of Florence, Ky. 41022. A typical SWECO screen for paper coatings involves the use of one or more screens positioned horizontally in a screening chamber. The coating material is introduced at one end of the screening chamber where it spreads over the screen. Generally the screen or screens in the screening chamber are gently vibrated so that the filtered coating material falls by gravity through the screen into the bottom of the screening chamber where it can be collected and pumped to the coating apparatus. Large particulates and other debris and contaminates collect on the surfaces of the screens which must then be cleaned periodically to prevent the screen from becoming clogged.

The typical system employed in the past to clean such screens has involved the use of one or more cluster spray heads mounted above the screen. These spray heads may have up to thirteen (13) spray nozzles oriented in different directions. The function of the sprays from the nozzles are to wash down the interior surfaces of the screening chamber as well as to remove any contaminates accumulated on the screen surface. However, screen cleaning methods of this type have proven to be ineffective since the sprays apply water to the surface of the screen haphazardly and in a completely random manner while removing little if any of the accumulated debris. Also, the conventional cluster nozzles have been found to fail to adequately clean the interior surfaces of the screening chamber, and over time, large chunks of dried coating which form on the screening chamber walls become dislodged and fall on the screen surface causing damage to the screens. Accordingly it will be seen that there is a need for an improved means for periodically cleaning the screens and screening chamber interior of the typical coating screens used in the paper industry.

SUMMARY OF INVENTION

An object of the present invention is to provide a simple and efficient spray system for cleaning generally horizontally disposed filter media such as the screens used in filtering paper coatings. In accordance with the present invention, the spray system comprises a plurality of spray bars located above, and in close proximity to the screen, positioned transversely across the screening chamber. Each of the spray bars includes a plurality of nozzles oriented to direct cleaning sprays of water tangentially across the screen surface at different angles to sweep away any accumulated debris, and against the interior surfaces of the screening chamber to remove any coating caked thereon. According to the present invention, the screen surfaces are completely cleaned without any need for providing movable spray heads or for tilting the screens. Moreover, the location, orientation and nozzle type selected for each nozzle on the spray bars provides a shower system which produces superior cleaning results for both the interior surfaces of the screening chamber, and the screen surfaces that has heretofore not been achieved by the existing shower systems.

Accordingly, it is an object of the present invention to provide an efficient and effective screening system for the typical generally horizontally disposed filter screens used in the paper industry for filtering paper coating materials.

An additional object is to provide in such a screening system features which enable the user to keep the interior of the screening chamber free from dried chunks of coating material which in the past have flaked off and produced damage to the screening media.

Other objects of the invention will become apparent to those skilled in the art from a consideration of the description herein of an exemplary embodiment of the present invention which follows.

BRIEF DESCRIPTION OF DRAWING

FIG. 1 is a side view of a typical screening chamber with a horizontally disposed screen, showing the cleaning showers used in the prior art;

FIG. 2 is a side view of the screening chamber of FIG. 1 showing the arrangement of the cleaning showers according to the present invention;

FIG. 3 is a side view of the screening chamber of FIG. 2 illustrating the angles at which the different nozzles project their spray toward the screen surface in the present invention;

FIG. 5 shows typical nozzle orientations for the nozzles on one of the spray bars of the present invention;

FIG. 6 shows typical nozzle orientations for the nozzles on another spray bar of the present invention; and, FIG. 7 illustrates the preferred angular orientation for the spray nozzles located at the inlet to the screening chamber.

DETAILED DESCRIPTION

Figure 4:
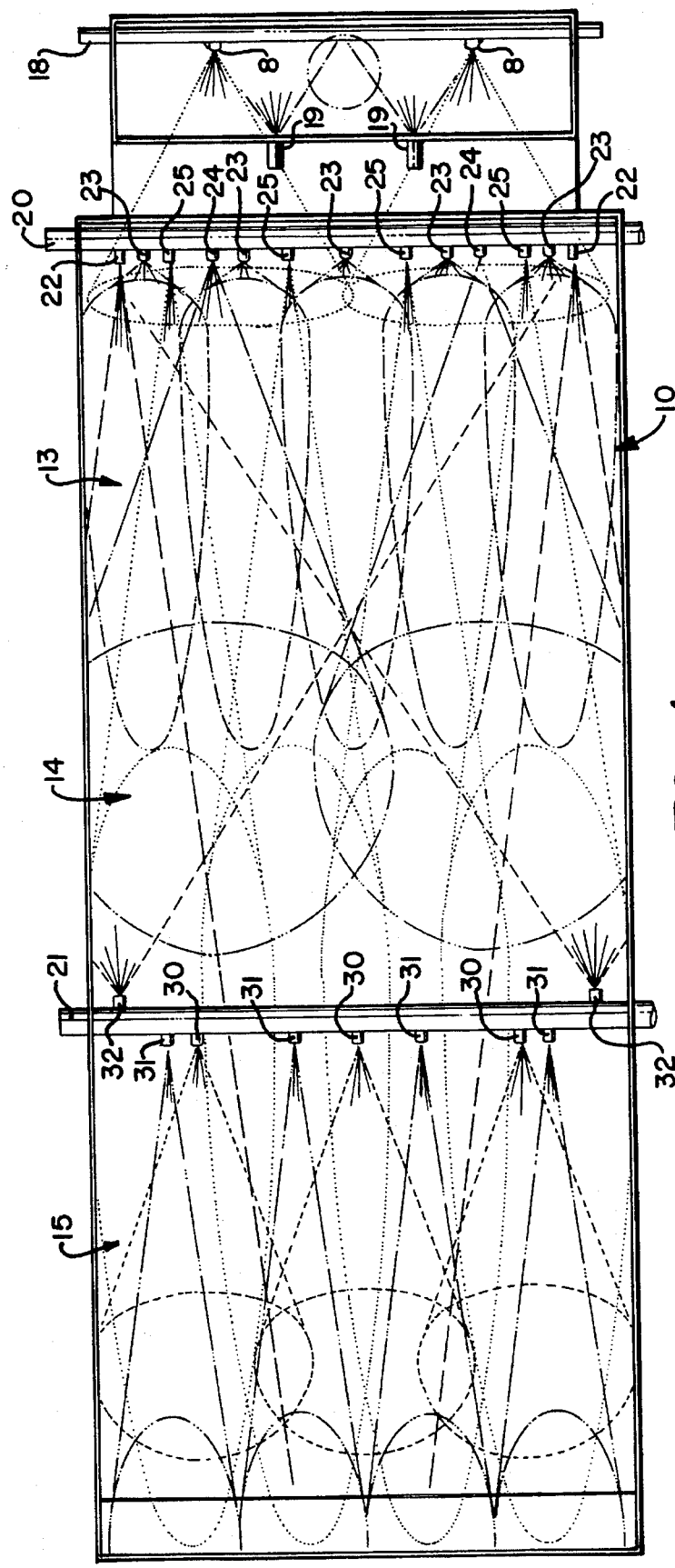
FIG. 4 is a top plan view of the screening chamber of FIG. 3 showing diagrammatically an overlay of the shower patterns created by the spray nozzles of the present invention.

In a typical paper making process, the coatings applied to the paper are initially prepared in a coating kitchen. Fresh coating material is screened to remove particulates too large to pass safely through the coating apparatus, and then pumped to a coating supply tank. From the coating supply tank, the coating material is typically screened one or more times before reaching the coating pan of the coating apparatus. After the coating apparatus, excess coating material is returned to the coating supply tank where it is mixed with fresh coating from the coating kitchen and the filtering cycle begins again.

A typical screening chamber is shown in FIG. 1. The chamber 10 includes an inlet 11 for coating to be filtered and an exit 12 where the screened and filtered coating material is removed. The coating material, after entering the coating chamber 10, collects on the surface of the horizontal filter elements or screens 13, 14 and 15, where it is filtered, and the filtered material falls by gravity to the bottom of the chamber. During the process, large particulates, debris and other contamination collect on the upper surfaces of the filter elements 13, 14 and 15. When the screens finally become ineffective or blinded so that the coating throughput is diminished, the incoming coating must be bypassed to another screening chamber so that the blinded screen can be cleaned. Typically, in the past cluster nozzles as shown at 16 and 17 of FIG. 1, have been used to spray water on the surface of the screens and the interior walls of the chamber 10 to clean the screens and renew the filtering action. However, as mentioned hereinbefore, cluster nozzles have been found to be essentially ineffective for this purpose.

In accordance with the present invention, a novel arrangement of spray bars and nozzles, has been developed to give complete and efficient cleaning action to the cleaning chamber and screens particularly as shown in FIG. 2. For this purpose, a first spray bar 18 is located in the inlet of the screening chamber 10 with at least two nozzles preferably of the V-jet type oriented downwardly to direct their spray pattern onto the leading edge of screen 13. In the preferred embodiment of the present invention, the nozzles 8, 8 on the spray bar 18 are directed downward at an angle of about 30–35 degrees from the horizontal. A second pair of nozzles 19, 19 are arranged opposite nozzles 8, 8 to project their spray pattern rearwardly onto the interior surfaces of the inlet of the screening chamber 10 to clean those surfaces.

Within the screening chamber 10 at least two additional spray bars 20 and 21 are positioned across the chamber 10 located preferably at the beginning of screen 13 and approximately at the end of screen 14 and beginning of screen 15. Spray bar 20 in accordance with a preferred embodiment of the present invention may include up to thirteen (13) separate nozzles spaced across the spray bar and oriented at different angles toward the screens 13, 14 and 15 and the sides of the screening chamber 10. The number of nozzles and their spacing across the header bar is dependent upon the size and shape of the screening chamber. Thus, more or fewer nozzles could be used, depending upon the installation, to still yield satisfactory cleaning action. Each of the nozzle types is chosen to produce either a full jet spray pattern or a V-jet spray pattern depending upon its position on the header bar 20. For example, as shown in FIG. 4, a pair of full jet nozzles 22, 22 are positioned at the extreme ends of bar 20 near the side walls of the screening chamber 10 to project a general spray pattern exemplified by the spray angle 26 shown in FIG. 3. These two nozzles 22, 22 are designed to clean the sides of the spray chamber and to provide enough water at the sides of the screen to carry any debris or particulates found thereon into the collection pit 37. A second set of nozzles 23 constituting a total of five (5), also of the full jet type, are arranged symmetrically around the center line of the screening chamber to project spray patterns tangentially onto screen 13. These nozzles 23 are preferably oriented at an angle of about 35–45 degrees downwardly from the horizontal toward the screen 13. As shown in FIG. 4, the spray from nozzles 23 project patterns that extend onto the leading edge of screen 14 and slightly overlap one another from side-to-side. The spray from nozzles 23 serves to carry any contaminates dislodged from the screen by the spray from nozzles 8, 8 of header 18 further along the surface of the screens 13 and 14 toward the collection pit 37. A third set of nozzles 24 are paired at points equidistant from the centerline of the screening chamber 10 to project sprays further along the screens 14 and 15. Nozzles 24 are preferably of the V-jet type to produce patterns substantially as shown in FIG. 4 wherein the patterns overlap one another somewhat at the center of screen 14, yet still impact against the interior side walls of the screening chamber. As shown in FIGS. 3 and 5, the angular orientation of nozzles 24 is on the order of from about 7–10 degrees downwardly from the horizontal, to provide sprays tangentially toward the screens. Finally, with respect to spray bar 20, another set of nozzles 25 comprising a total of four (4), are arranged symmetrically about the centerline of the screening chamber 10 along spray bar 20 to produce elongated spray patterns to the end of screen 15 as shown in FIG. 4. Nozzles 25 are preferably oriented slightly downwardly at an angle of less than about 5 degrees with respect to the horizontal, so that the spray patterns produced reach the end of the screening chamber 10 and compliment the sprays issuing from nozzles 22 and 23. Nozzles 25 are preferably of the V-jet type to achieve the desired purpose of producing elongated spray patterns with considerable overlap between each individual pattern. Thus it will be seen that in the preferred embodiment, the nozzles on spray bar 20 are arranged to produce short range, intermediate range and long range spray patterns with considerable overlap, to achieve an efficient cleaning action.

However, since the force of the sprays from nozzle sets 22, 23, 24 and 25 of spray bar 20 may not completely sweep away all of the particulates, debris and other contaminates from the far ends of screens 14 and 15, several additional nozzle sets are arranged on spray bar 21 to complete the cleaning action. Within the short range, a set of nozzles 30 are arranged on spray bar 21 with a first nozzle located directly on the centerline of the screening chamber 10, and a pair of additional nozzles located equidistantly on either side thereof. The nozzle set 30 comprising three (3) separate nozzles of the V-jet type are preferably arranged to project their sprays downwardly at an angle of about 10–15 degrees with respect to the horizontal, to achieve overlapping spray patterns as shown in FIG. 4. The angle of projection of spray nozzles 30 is shown in FIG. 3 as angle 33. In addition to nozzles 30, a second set of nozzles 31 comprising four (4) nozzles of the V-jet type are arranged equidistantly from one another across spray bar 21 and are oriented at an angle 34 of about 5–10 degrees below the horizontal to achieve the spray patterns illustrated in FIG. 4. The sprays from these nozzles produces a cleaning action which reaches beyond the end of screen 15 toward the end of the screening chamber 10. In this manner, the screens 13, 14 and 15 are completely swept clean by the spraying action. To further ensure that the interior side walls of the screening chamber are cleaned, spray bar 21 may also be provided with a pair of back spray nozzles 32, 32 at each end of the spray bar near the side walls. In the preferred embodiment, the back spray nozzles 32, 32 are directed slightly upward away from the screen at an angle of less than about 10 degrees and project a spray pattern defined by angle 35 in FIG. 3, to wash off any dried coating that might not have ben removed from the interior walls by the spray nozzles 22 and 24 of spray bar 18. During the screen cleaning sequence, the screens 13, 14 and 15 are flooded so that the contaminates, debris and other foreign matter blocking the throughput is washed over the edge of the wall 36 of the screening chamber into the collection pit 37.

The spray volume issuing from the various nozzles on spray bars 18, 20 and 21 may be varied depending upon the application. Flow rates vary from about 5 gallons per minute for the nozzles on spray bar 18 to about 2 gallons per minute for the nozzles 31 on spray bar 21. Each of the nozzles are shaped to achieve the desired spray pattern, and the rate of flow calculated for each nozzle is at a pressure of about 40 psi. It will be understood that the number of nozzles used on each spray bar, the type of nozzle selected and the angular orientation of the nozzles are all variable, depending upon the application, and are best derived by trial and error. Nevertheless, it will be understood that, in general, the present invention is directed to a cleaning system for filter screens or the like in which fixed spray showers are arranged to provide tangentially oriented spray patterns which overlap and assist one another in removing particulates, debris and other contaminates from the surface of the screens. By using different types of nozzles at selected locations having varying flow rates, the present invention takes advantage of the known theory regarding cleaning efficiency of water sprays as being dependent on the water pressure and the contact area of each water jet. Thus by varying the spray distribution patterns across the screens, from end-to-end, and from side-to-side, a complete and efficient cleaning can be accomplished.

It will thus be recognized that many modifications and/or variables are contemplated by the inventive concept described herein. Therefore, the invention should not be limited to the details disclosed for the specific embodiment shown and described.

What is claimed is:

1. In combination, a filter screen located in a screening chamber and apparatus for cleaning the surface of the filter screen comprising:

(a) a screening chamber having an inlet;

(b) at least one screen element positioned generally horizontally in the screening chamber which extends from one side of said screening chamber to the other;

(c) a plurality of spray bars (18, 20, 21) positioned transversely across said screening chamber, located above and in close proximity to said screen element wherein a first spray bar (18) is positioned in the inlet to said screening chamber, said first spray bar including at least two spray nozzles spaced equidistant from the centerline of said screening chamber and oriented downwardly with respect to the horizontal at an angle of about 30–35 degrees for directing cleaning liquid to provide spray patterns of generally elliptical shade on the leading edge of said screen element, and wherein a second spray bar (20) is located at the inlet end of said screening chamber, said second spray bar including a multiplicity of spray nozzles spaced across said spray bar which are oriented downwardly with respect to the horizontal at different angles ranging from about 0–45 degrees with respect to the horizontal for directing cleaning liquid to provide overlapping spray patterns on said screen surface and on the interior side walls of said screening chamber, and wherein a third spray bar (21) is located within said screening chamber at an intermediate position between the inlet end of said screening chamber and the end remote from said inlet end, said third spray bar including multiple spray nozzles of different types spaced across said spray bar which are oriented at different angles ranging from about 0–10 degrees above, to about 0–15 degrees below the horizontal, for directing cleaning liquid to provide overlapping spray patterns on said screen surface and on the interior side walls of said screening chamber; and, (d) means for supplying a cleaning liquid under pressure to said spray bars.

2. The apparatus of claim 1 wherein the nozzles on said first spray bar (18) are of the V-Jet Type.

3. The apparatus of claim 2 wherein said second spray bar (20) includes from one to five full jet spray nozzles, one of which is positioned at the centerline of said screening chamber and the others of which are positioned symmetrically in pairs along said second spray bar with respect to said centerline at equal distances from said centerline, said full jet spray nozzles being directed downwardly at an angle of about 40–50 degrees with respect to the horizontal to provide short range cleaning action to said screen element.

4. The apparatus of claim 3 wherein said second spray bar further includes at least two V-jet spray nozzles positioned at equal distances from the centerline of said screening chamber and directed downwardly with respect to the horizontal at an angle of about 5–10 degrees to provide intermediate range cleaning action to said screen element.

5. The apparatus of claim 4 wherein said second spray bar further includes two additional pairs of V-jet spray nozzles positioned symmetrically on said spray bar about the centerline of said screening chamber and directed downwardly at an angle of about 0–5 degrees to provide long range cleaning action to said screen element.

6. The apparatus of claim 5 wherein said second spray bar also includes at least one additional pair of full jet spray nozzles positioned on said spray bar at the respective ends thereof adjacent to the side walls of said screening chamber which project spray patterns substantially horizontally over said screen element and onto the sides of said screening chamber to provide general cleaning action to said screen element and screening chamber.

7. The apparatus of claim 6 wherein said third spray bar includes at least three V-jet spray nozzles, one of which is positioned at the centerline of said screening chamber and the other of which are positioned symmetrically in a pair along said third spray bar with respect to said centerline at equal distances from said centerline, said spray nozzles being directed downwardly at an angle of about 10–15 degrees with respect to the horizontal to provide generally circular shaped, overlapping spray patterns on the remote end of said screen element.

8. The apparatus of claim 7 wherein said third spray bar further includes at least two additional pairs of V-jet spray nozzles positioned equidistant from the centerline of said screening chamber along said third spray bar, which are directed downwardly with respect to the horizontal at an angle of about 5–10 degrees to provide generally elongated, elliptically shaped spray patterns which extend to the remote end of said screening chamber.

9. The apparatus of claim 8 wherein said third spray bar also includes at least one pair of full jet spray nozzles positioned on said third spray bar at the respective ends thereof adjacent to the side walls of said screening chamber which project spray patterns substantially horizontally and rearwardly over said screen element and onto the sides of said screening chamber to provide general cleaning action to said screen element and screening chamber.

* * * * *